(12) United States Patent
Jönsson

(10) Patent No.: US 6,918,471 B2
(45) Date of Patent: Jul. 19, 2005

(54) HYDRODYNAMIC BRAKE

(75) Inventor: Hans Jönsson, Södertälje (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/332,421

(22) PCT Filed: Jun. 28, 2001

(86) PCT No.: PCT/SE01/01490

§ 371 (c)(1),
(2), (4) Date: May 12, 2003

(87) PCT Pub. No.: WO02/04835

PCT Pub. Date: Jan. 17, 2002

(65) Prior Publication Data

US 2003/0173169 A1 Sep. 18, 2003

(30) Foreign Application Priority Data

Jul. 7, 2000 (SE) .............................. 0002591

(51) Int. Cl.[7] ............................................. F16D 57/02
(52) U.S. Cl. ...................................... 188/296; 188/290
(58) Field of Search ........................... 188/296 O, 290; 60/337, 363, 364, 365

(56) References Cited

U.S. PATENT DOCUMENTS

| | | | |
|---|---|---|---|
| 3,860,097 A | * | 1/1975 | Braschler et al. ........... 188/296 |
| 4,454,935 A | | 6/1984 | Pryor |
| 4,938,323 A | | 7/1990 | Höller et al. |
| 5,571,975 A | * | 11/1996 | Smith et al. ................. 188/296 |

FOREIGN PATENT DOCUMENTS

FR        2501316        9/1982

* cited by examiner

*Primary Examiner*—Robert A. Siconolfi
*Assistant Examiner*—Melanie Torres
(74) *Attorney, Agent, or Firm*—Ostrolenk, Faber, Gerb & Soffen, LLP

(57) ABSTRACT

A hydrodynamic brake for a vehicle having a stator and a rotor, which each comprise an annular recess and a plurality of vanes which are provided in the respective recess. The rotor rotates in a rotation direction such that a relatively high pressure is created on a first side of the respective vanes of the stator and a relatively low pressure on a second side of each vane of the stator. This pressure difference is used for the supply and the discharge, respectively, of the fluid. A respective supply opening is provided in the stator in the vicinity of the second side of a respective vane and a respective discharge opening is provided in the stator in the vicinity of the first side of a respective vane.

16 Claims, 4 Drawing Sheets

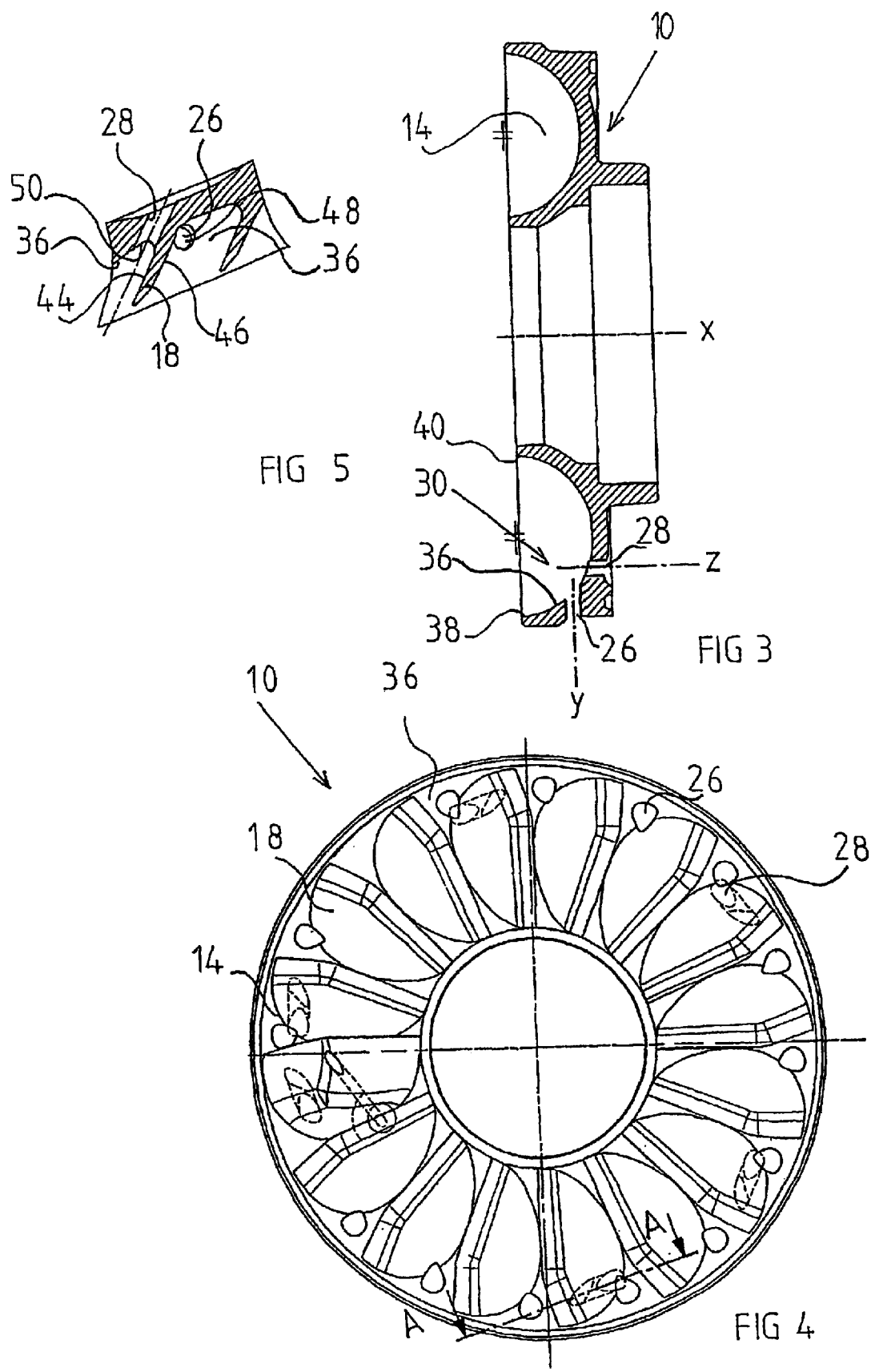

HYDRODYNAMIC BRAKE

BACKGROUND OF THE INVENTION AND PRIOR ART

The present invention relates to a hydrodynamic brake and particularly to a brake which moves fluid rapidly into and out of the brake.

Auxiliary brakes are principally used in heavy vehicles, such as lorries and buses, in order to avoid wear of the ordinary brakes of the vehicle, such as the service brakes, for example at braking on long downhill slopes. An example of such an auxiliary brake is a hydrodynamic retarder, which generates a braking moment by means of any suitable oil between a stator and a rotor. The stator and the rotor constitute together a toroid-shaped space, which is called torus. The stator as well as the rotor is provided with a plurality of vanes and the oil is guided during the rotation of the rotor by the vanes within the toroid-shaped space. During the braking process, the kinetic energy of the oil is transformed to heat energy. The oil has to be cooled after it has left the toroid-shaped space. Thereafter the oil may again be supplied to the toroid-shaped space. The retarder is connected to the power train of the vehicle, for example, at the propeller shaft in connection to the gearbox of the vehicle for allowing braking of the driving wheels of the vehicle. The retarder may be provided directly on the propeller shaft or be connected to that shaft via a gear unit. At a low number of revolutions of the propeller shaft and when the space between the stator and the rotor, i.e. the toroid-shaped space, is filled with oil, the braking effect of the retarder increases with the rate of rotation of the propeller shaft, and the output braking moment of the retarder is substantially proportional to the number of revolutions of the propeller shaft. Consequently, at a certain number of revolutions of the propeller shaft, a certain maximum output braking moment may be obtained. At higher number of revolutions of the propeller shaft, the output braking moment depends on the coefficient of fullness of oil in the toroid-shaped space. Consequently, by controlling the pressure in the space, the output braking moment may be adjusted. Before the retarder begins to produce an output braking moment, the space between the stator and the rotor has to be filled with oil. Previously, the retarder has comprised a pump and an oil reservoir. The lower the speed of the propeller shaft of the vehicle is, the longer time it take to fill the space around the stator and the rotor. In order to speed up this operation, an oil accumulator is often used in connection with the oil reservoir.

The working medium of a hydrodynamic retarder is any suitable oil. As mentioned above, the kinetic energy of the oil is transformed to heat energy during a braking process. In order to avoid overheating of the oil, it is important that the oil flow through the toroid-shaped space be high. With a high oil flow, one may obtain an effective cooling of the oil. In order to obtain a high flow of oil, the pressure differences, which are created when the rotor rotates in a certain direction of rotation, are used. After the oil has left the toroid-shaped space, the oil is guided to a cooling system/heat exchanger of the vehicle, such as a cooling water circuit in the vehicle. Thereafter, the oil may be returned to the toroid-shaped space. The cooled oil may be used for cooling the retarder. As a consequence of that, a great quantity of heat is produced by the retarder during a braking process. Furthermore, the working life of the oil is influenced by high temperatures, wherein the time which pass between the exchange intervals decreases if the temperature of the oil is kept down.

FIG. 1 shows parts of a known retarder for a heavy vehicle, such as a lorry. The known retarder comprises a double rotor 1 and two stators 2, 3, which surrounds a shaft 4 to form two toroid-shaped spaces 5. The inner diameter of the respective toroid-shaped space is used as an inlet 6 and the outer diameter as an outlet 7. By having the inlet 6 in connection to the inner diameter of the torus, a delivering channel 8 has to be provided between the shaft 4 and the inlet 6. Hereby, this retarder construction takes up a great deal of space. Furthermore, it ought to be noted that when the rotor rotates, the pressure difference, which is created between the area where the inlets 6 are located and the area where the outlets 7 are located is relatively small. Consequently, no higher flow of the working medium may be obtained by this construction.

SUMMARY OF THE INVENTION

The object of the present invention is to eliminate the above-mentioned problem. Especially, it is aimed at a hydrodynamic brake, which allows a high flow of the working medium through the toroid-shaped space, i.e. a large quantity of fluid per time unit, which flows through the toroid-shaped space of the brake. A large quantity of fluid per time unit implies that the fluid also may work as cooling medium, wherein the heat energy generated during the braking process may be carried off by the fluid. A further object of the present invention is to provide a hydrodynamic brake by which it is possible to obtain a large braking moment in spite of the small dimensions of the brake.

These objects are achieved by features of hydrodynamic brake.

Such a hydrodynamic brake has supply openings provided in the vicinity of that side of the vane of the stator where a relatively low pressure is created when the rotor rotates in a certain direction of rotation. This makes it possible to quickly obtain a braking moment. If the hydrodynamic brake is connected to the power train of the vehicle, the driver of the vehicle will experience satisfaction when he brakes with the retarder of the vehicle. Furthermore, that location of the supply openings offers the possibility of providing the brake directly adjacent to a rotating shaft without having to provide any supply channel between the rotary shaft and the toroid-shaped space, which is the case in the known brake initially described.

According to an embodiment of the invention, said supply opening is located in a radially outer area of the stator. Advantageously, the supply opening is located in this area since the pressure is lowest in this area.

According to a further embodiment of the invention, the supply opening has an orifice, which at least partly cuts through the bottom surface. The orifice may be provided such that it partly cuts through the vane and partly cuts through the bottom surface. Alternatively, the whole orifice may cut through the bottom surface. It ought to be noted that in the outer area of the stator in connection to the second side of a vane, when the rotor rotates in said direction of rotation, hardly any fluid exists in said area at a low coefficient of fullness, i.e. when only a fraction of the space between the stator and rotor is filled with fluid. Thus, the pressure is lowest in said area.

According to a further embodiment of the invention, said supply opening extends through the bottom surface.

According to a further embodiment of the invention, said supply opening has a longitudinal axis, which is substantially perpendicular to the axis of rotation. By the above mentioned location of the supply opening and since the supply opening has a longitudinal axis which is substantially perpendicular to the axis of rotation, the supply of the fluid will occur in the flow direction of the fluid within the toroid-shaped space. Hereby, the fluid stream in the space between the stator and the rotor will not be appreciably disturbed.

According to a further embodiment of the invention, said fluid is arranged to be supplied to said toroid-shaped space via a plurality of supply openings. Since the supply openings are provided in connection to the outer diameter of the stator, a large supply area may be obtained in spite of the small dimensions of the retarder. With a large supply area, a quicker turn over of the oil may be obtained through the toroid-shaped space.

According to a preferred embodiment of the invention, a supply opening is provided in substantially all pockets of the stator. Hereby, the brake may be made very compact.

According to a further embodiment of the invention, said discharge opening is provided in the vicinity of said first side of a vane of the stator. Consequently, one uses the pressure difference, which is created on the respective sides of a vane of the stator during rotation of the rotor, for the supply and discharge, respectively, of the fluid. Hereby, one may obtain a high flow of fluid through the toroid-shaped space.

According to a further embodiment of the invention, said discharge opening is located in a radially outer area of the stator. Since both of said supply opening and said discharge opening with advantage are located in said outer radial area of the stator, the stator and the rotor may be located adjacent to the axis of rotation, which not is possible with the brake which is accounted as known technique. Hereby, one may obtain a greater volume of the space between the stator and the rotor according to the invention at the same time as the outer dimensions of the stator and the rotor are less than in the brake which is accounted as known technique, i.e. the toroid-shaped space may be place closer to the axis of rotation and the difference between the outer and inner diameter of the toroid-shaped space may be made greater than the corresponding difference of the brake according to the prior art technique, which has been accounted in the description, at the same time as the brake according to the invention discloses a smaller outer diameter than said known brake. Consequently, an advantage of the brake according to the invention is that it requires less space than the brake accounted as prior art technique, i.e. one uses the space better.

According to a further embodiment of the invention, said discharge opening has an orifice, which at least partly cuts through said bottom surface. The orifice may be provided in such a way that it partly cuts through the vane and partly cuts through the bottom surface. Alternatively, the whole orifice may cut through the bottom surface. It ought to be noted that in the outer area of the stator in connection to the first side of a vane where the vane protrudes from the bottom surface when the rotor rotates in said direction of rotation, the pressure is highest since the fluid stream is thickest in this area. Hereby, the most effective discharge of the fluid is obtained when the discharge opening ends in said area.

According to a further embodiment of the invention, said discharge opening has a longitudinal axis, which is substantially parallel with the axis of rotation. By the above-mentioned location of the discharge opening and since the discharge opening has a longitudinal axis which is substantially parallel with the axis of rotation, the discharge of the fluid will take place in the flow direction of the fluid in the toroid-shaped space. Hereby, the fluid stream in the space between the stator and the rotor will not be appreciably disturbed.

According to a further embodiment of the invention, said fluid is arranged to be discharged via a plurality of discharge openings. Hereby, one may obtain a quick discharge of the fluid from the toroid-shaped space. Furthermore, it ought to be noted that with the brake according to the invention, the quantity of fluid, which flows through the toroid-shaped space, may amount to 500 l/min. As mentioned in the initial description, the fluid is cooled after it has left the toroid-shaped space and thereafter it is returned to the toroid-shaped space. By the large cooled circulating fluid quantity, the fluid also works as a cooling medium, which is arranged to remove the heat energy from the brake, generated during the braking process.

BRIEF DESCRIPTION OF THE DRAWINGS

The present invention is now to be explained by a description of a preferred embodiment and with reference to the attached drawings.

FIG. 3 shows the stator according to FIG. 2, FIG. 4 shows the location of the vanes, the supply openings and the discharge openings in the stator according to FIG. 2, FIG. 5 shows the section A—A of the stator according to FIG. 4 in which the location of a supply opening and a discharge opening is shown in detail.

DETAILED DESCRIPTION OF A PREFERRED EMBODIMENT OF THE INVENTION

Figure 1:
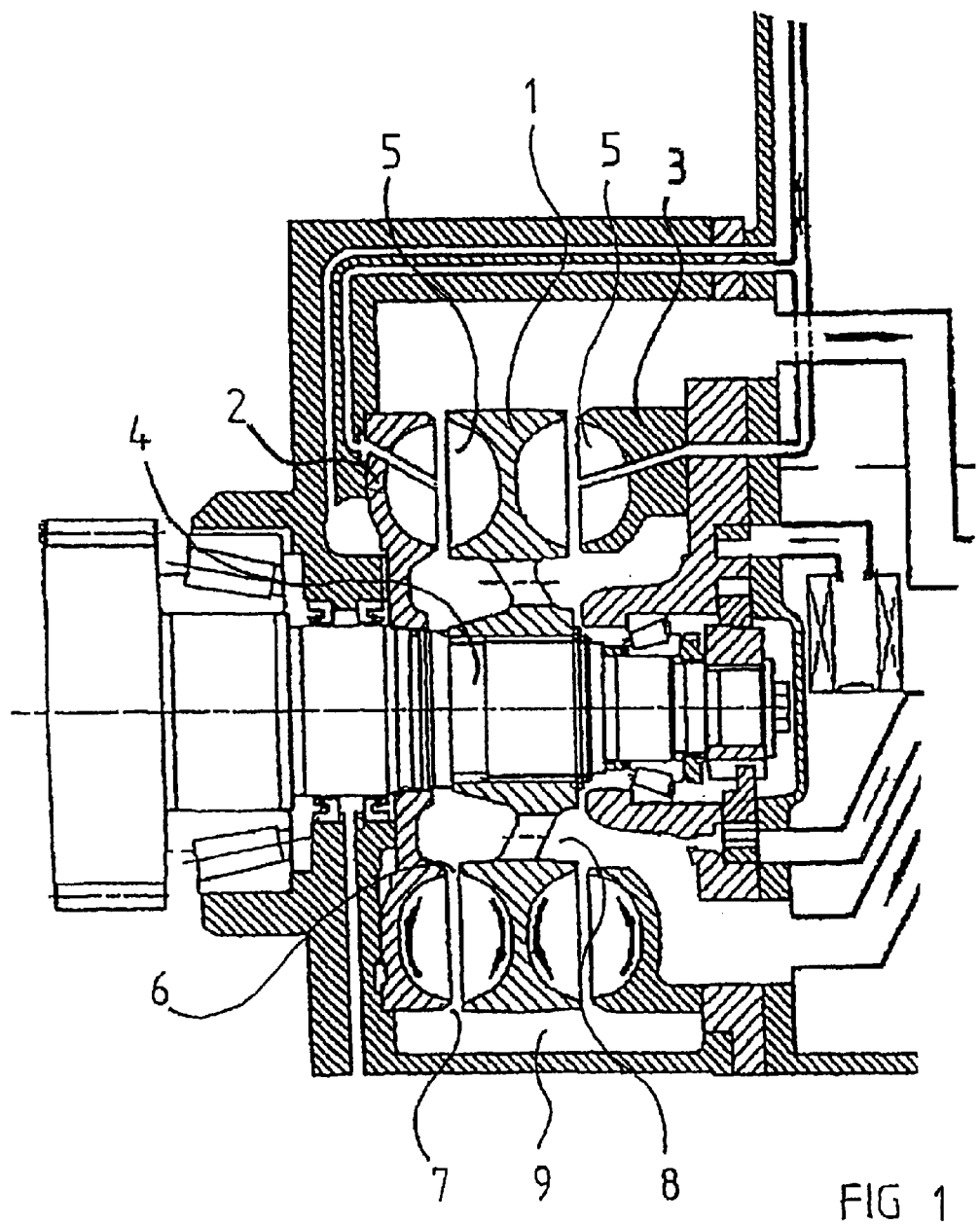
FIG. 1 shows a cross-section through a portion of a hydrodynamic brake of a vehicle according to known technique.

FIG. 1 shows a cross-section through a retarder in form of a hydrodynamic brake of a motor driven vehicle. The known retarder is accounted in the initial description.

Figure 2:
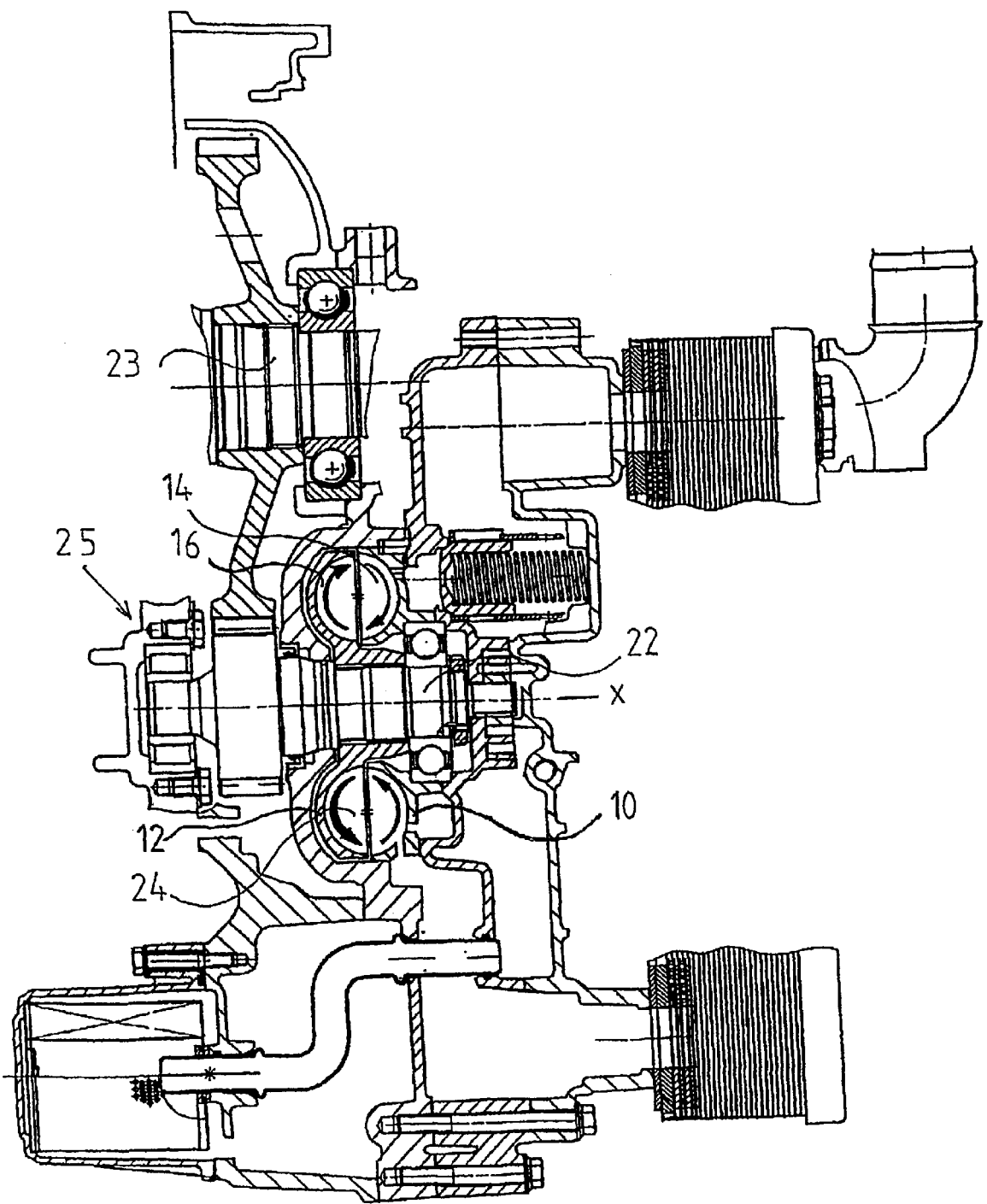
FIG. 2 shows a cross-section through a portion of a hydrodynamic brake of a vehicle according to the invention.
Figure 8:
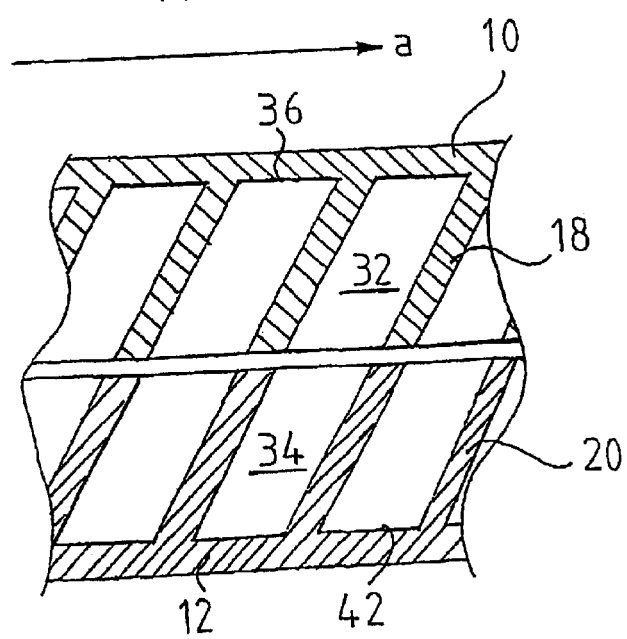
FIG. 8 shows the stator and the rotor of the brake according to FIG. 2 and the direction of rotation of the rotor.

FIG. 2 shows a cross-section through a portion of a hydrodynamic brake in form of a retarder of a motor driven vehicle according to the invention. The retarder comprises an annular stator 10 and an annular rotor 12 which each comprises an annular recess 14, 16. The stator comprises a plurality of vanes 18 which are provided in the recess 14 of the stator, and the rotor 12 comprises a plurality of vanes 20 which are provided in the recess 16 of the rotor 12, see also FIG. 8. In a mounted state, the annular stator 10 and the annular rotor 12 surround a shaft 22 in such a way that the recesses 14, 16 together form a toroid-shaped space 24. The retarder is connected to the power train of the vehicle, for example at the propeller shaft 23 of the vehicle in connection to the gearbox of the vehicle in order to allow braking of the driving wheels of the vehicle. The retarder may be provided directly on the propeller shaft 23 or via a gear unit 25 such as in FIG. 2. The stator 10 is fixedly provided in the vehicle in a suitable way and the rotor is fixedly connected to the shaft 22. During propulsion of the vehicle, the rotor 12 is arranged to rotate around an axis of rotation x in relation to the stator 10 in a direction of rotation a, cp. FIG. 8.

As is evident in FIG. 3 and FIG. 4, the stator 10 comprises a plurality of the supply openings 26 and a plurality of the discharge openings 28. The supply openings 26 and the discharge openings 28 are located in an outer radial area 30 of the stator 10. Each of the respective supply openings 26 has a longitudinal axis y which is substantially perpendicular to the axis of rotation x and each of the respective discharge openings 28 has a longitudinal axis z which is substantially parallel to the axis of rotation x.

FIG. 5 shows in detail how a supply opening 26 and a discharge opening 28 are located in relation to a vane 18 of the stator 10.

As is evident in FIG. 4 and FIG. 8, the vanes 18 of the stator 10 divide the annular recess 14 of the stator in such a way that two adjacent vanes form a pocket 32 between each other. Likewise, the vanes 20 of the rotor 12 divide the annular recess 16 of the rotor in such a way that two adjacent vanes 20 form a pocket 34 between each other. A bottom surface 36 of the respective pocket 32 extends between two adjacent vanes 18 of the stator 10. Furthermore, the bottom surface 36 extends between an outer radial edge 38 and an inner radial edge 40, see FIG. 3. Likewise, a bottom surface 42 of the respective pocket 34 extends between two adjacent vanes 20 of the rotor 12, see FIG. 8. Furthermore, the bottom surface 42 extends between an outer radial edge (not shown) and an inner radial edge (not shown).

As be evident in FIG. 8, a pocket 32 of the stator 10 is open towards a pocket 34 of the rotor 12. Furthermore, the vanes 18, 20 incline in relation to the bottom surfaces 36, 42.

When the rotor 12 rotates around the axis of rotation x in the direction a, a relatively high pressure will be created on a first side 44 of the respective vane 18 of the stator 10 and a relatively low pressure on the second side 46 of the respective vane 18 of the stator 10, cp. FIG. 5.

During a braking process, a fluid/a working medium in form of a hydraulic liquid, for example any suitable oil, is arranged to be supplied to the toroid-shaped space 24, via the supply openings 26 of the stator 10, in order to brake the rotor 12 and consequently the driving wheels of the vehicle. The fluid is discharged via the discharge openings 28 of the stator 10. During the braking process, the medium will be guided by the vanes 20 of the rotor 12 in a direction of rotation a and radially outwards in the toroid-shaped space 24 along the bottom surface 42 of the pocket 34 and be thrown with a high velocity from the outer radial edge of a pocket 34 of the rotor 12 over to an outer radial edge 38 of a pocket 32 of the stator 10. The fluid hits the vanes 18 of the stator 10 and the motion of the fluid in the direction of rotation of the rotor 12 a is retarded and is guided by the vanes 18 of the stator 10 radially inwards along the bottom surfaces 36 of the pockets 32 until it reaches the inner radial edge 40. Hereby, the fluid hits the rotating vanes 20 of the rotor 12 at an angle such that the rotor 12 is braked.

Figure 6:
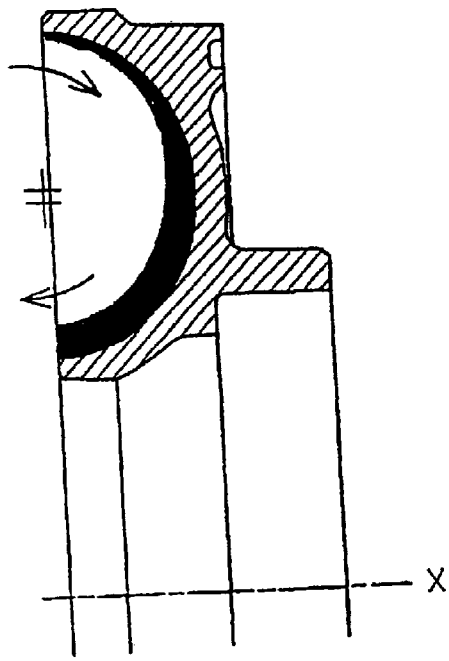
FIG. 6 shows how the fluid flows in the stator at a low coefficient of fullness.
Figure 7:
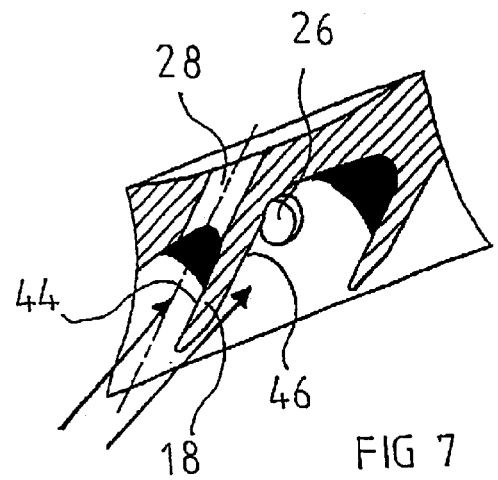
FIG. 7 shows a corresponding section as shown in FIG. 5 and how the fluid flows at a low coefficient of fullness.

In order to fill quickly or empty quickly the toroid-shaped space 24 with fluid, one uses the pressure difference, which is created around a respective vane 18 of the stator 10. A quick turnover/circulation of the working medium/the fluid through the toroid-shaped space 24 is obtained. In order to obtain as quick turnover of the working medium as possible, the supply openings 26 have an orifice 48, which cuts through the bottom surface 36 in the vicinity of the second side 46 of a vane 18, see FIG. 5. In this area, the pressure is lowest and at a low coefficient of fullness, i.e. when only a fraction of the toroid-shaped space 24 is filled with fluid, there is hardly any fluid in this area, see FIGS. 6 and 7 which show how the fluid flows at a low coefficient of fullness. The discharge openings 28 have an orifice 50 which cuts through the bottom surface 36 in the vicinity of the first side 44 of a vane 18 of the stator 10, see FIG. 5. In this area, the pressure is highest and at a low coefficient of fullness the fluid exists only in this area, see FIG. 7. With the hydrodynamic brake according to the invention, the pressure difference between the first side 44 of a vane 18 and a second side 46 of the vane 18 maybe over 35 bar.

In order to disturb the fluid stream in the toroid-shaped space 24 as little as possible, the supply and discharge, respectively, of fluid occur substantially in the flow direction. At the discharge opening 28, the flow direction is substantially parallel with the axis of rotation x. Consequently, the longitudinal axis z of the respective discharge opening is substantially parallel with the axis of rotation x as mentioned above in connection to FIG. 3. At the supply openings 26, the flow direction is substantially perpendicular to the axis of rotation x. Consequently, the longitudinal axis y of the respective supply opening is substantially perpendicular to the axis of rotation x as mentioned in connection to FIG. 3.

It ought to be noted that with the brake according to the invention, the quantity of fluid, which flows through the toroid-shaped space 24, may be up to 500 l/min. As mentioned in the initial description, the fluid is cooled after it has left the toroid-shaped space 24 and thereafter it is returned to the toroid-shaped space 24. By the large cooled circulating fluid quantity, the fluid also works as a cooling medium, which is arranged to remove the produced heat energy from the brake during the braking process.

The invention is not in any way restricted to the showed embodiment but may be varied and modified within the scope of the following claims.

What is claimed is:

1. A hydrodynamic brake comprising:
   an annular stator with a stator recess therein, an annular rotor opposite the stator with a rotor recess therein, the stator recess and the rotor recess opening toward each other to together define an annular toroid-shaped space; the stator and the rotor are coaxial around an axis of rotation of the rotor;
   a first plurality of vanes in the stator recess, a second plurality of vanes in the rotor recess, with the vanes in each recess extending toward the other recess, each pair of adjacent vanes in each recess define a respective pocket between the vanes of the pair, the stator and rotor each being shaped to define a bottom surface of each pocket between each pair of adjacent vanes, each pocket has an outer radial edge and an inner radial edge;
   the vanes being oriented in their respective pockets to define a first side of each vane in the rotation direction and an opposite second side of each vane opposite the rotation direction; the vanes being so located and oriented in their respective recesses that upon rotation of the rotor around the axis in the rotation direction, a higher pressure is developed on the first side of each vane of the stator and a lower pressure is developed on the second side of each vane of the stator;
   at least one supply opening in the stator, arranged closer to the second side of each vane of the stator than to the first side of the vane of each stator where there is a lower pressure, for supplying fluid to the toroid-shaped space, wherein the fluid in the space brakes the rotor during rotation; and at least one discharge opening for the fluid from the space.

2. The hydrodynamic brake of claim 1, wherein the stator has a radially outer area, the fluid supply opening is located in the radially outer area of the stator.

3. The hydrodynamic brake of claim 2, wherein the supply opening extends through the bottom surface of the of the pocket between a pair of adjacent vanes of the stator.

4. The hydrodynamic brake of claim 1, wherein the supply opening includes an orifice which at least partly extends through the bottom surface of the pocket between a pair of adjacent vanes.

5. The hydrodynamic brake of claim 1, wherein the supply opening extends through the bottom surface of the of the pocket between a pair of adjacent vanes of the stator.

6. The hydrodynamic brake of claim 1, wherein the supply opening has a longitudinal axis which is substantially perpendicular to the rotation axis of the rotor.

7. The hydrodynamic brake of claim 1, further comprising a plurality of the supply openings to the toroid-shaped space, each supply opening located at the second side of a respective one of the vanes of the stator.

8. The hydrodynamic brake of claim 7, further comprising a plurality of the vanes of the stator, a plurality of the pockets between the pairs of adjacent vanes in the stator and a respective supply opening in each of the pockets of the stator.

9. The hydrodynamic brake of claim 1, wherein the discharge opening is provided in the vicinity of the first side of the vanes in the stator.

10. The hydrodynamic brake of claim 9, wherein the stator has a radially outer area, and the discharge opening is located in the radially outer area of the stator.

11. The hydrodynamic brake of claim 10, wherein the fluid supply opening is located in the radially outer area of the stator.

12. The hydrodynamic brake of claim 10, wherein the discharge opening extends through the bottom surface of the pocket of the stator between a pair of adjacent vanes.

13. The hydrodynamic brake of claim 9, wherein the discharge opening comprises an orifice which at least partly cuts through the bottom surface of the pocket between the pair of adjacent vanes in the stator.

14. The hydrodynamic brake of claim 12, wherein the discharge opening has a longitudinal axis substantially parallel to the axis of rotation of the stator.

15. The hydrodynamic brake of claim 14, wherein the supply opening extends through the bottom surface of the of the pocket between a pair of adjacent vanes of the stator and the supply opening has a longitudinal axis which is substantially perpendicular to the rotation axis of the rotor.

16. The hydrodynamic brake of claim 9, further comprising a plurality of the vanes of the stator each having the second side thereof and a plurality of the discharge openings each in the pocket between a pair of adjacent vanes) with each discharge opening being near the first side of the respective vane of the pocket in which the discharge opening is located.

* * * * *